No. 619,655. Patented Feb. 14, 1899.
C. W. ATKINSON.
CYCLE, &c.
(Application filed Sept. 9, 1898.)
(No Model.) 2 Sheets—Sheet 1.
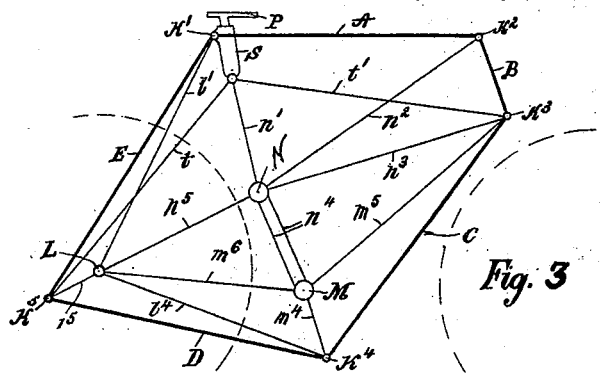
Fig. 3
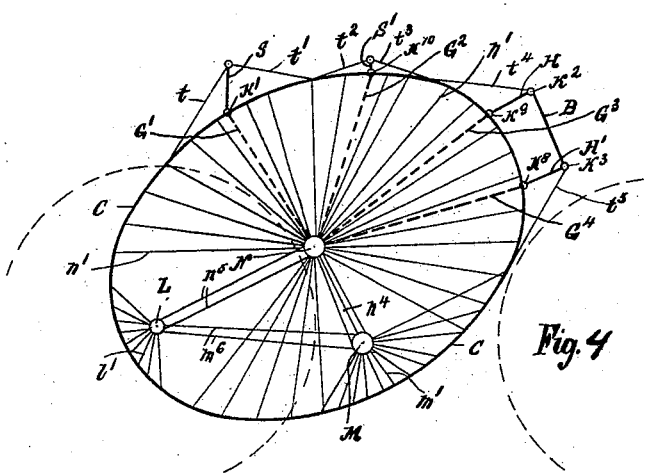
Fig. 4
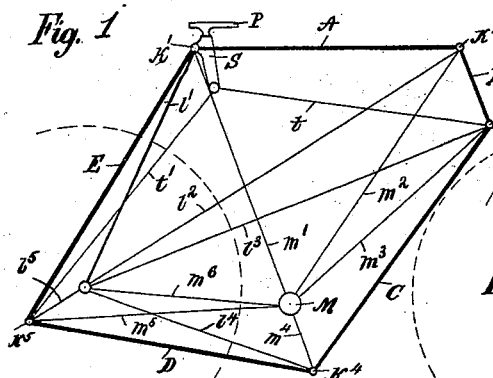
Fig. 1
Fig. 2
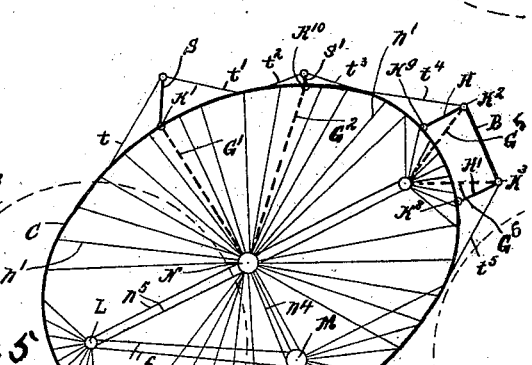
Fig. 5
Fig. 6
Witnesses:
J. B. Bolton
Inventor:
Claude William Atkinson
By Richard
his Attorneys.

No. 619,655. Patented Feb. 14, 1899.
C. W. ATKINSON.
CYCLE, &c.
(Application filed Sept. 9, 1898.)
(No Model.) 2 Sheets—Sheet 2.
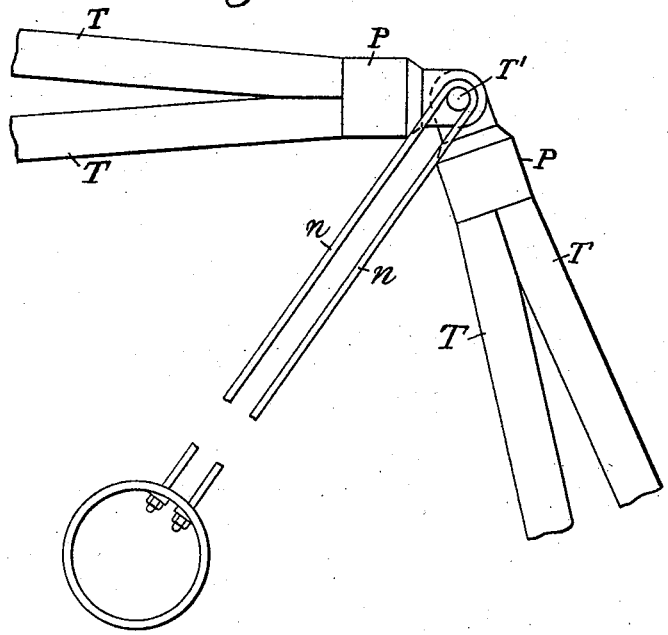
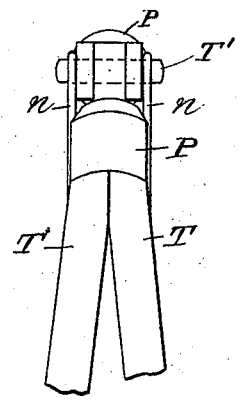
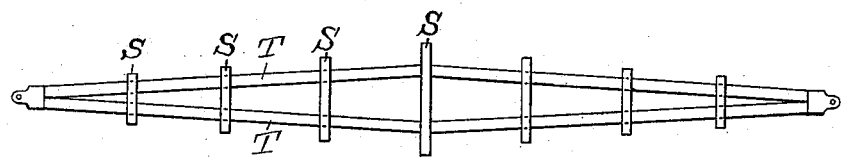
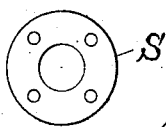
Witnesses.
Inventor:
Claude William Atkinson
By Richardson
his Attorneys
THE NORRIS PETERS CO., PHOTO-LITHO., WASHINGTON, D. C.

UNITED STATES PATENT OFFICE.

CLAUDE WILLIAM ATKINSON, OF PENARTH, ENGLAND.

CYCLE, &c.

SPECIFICATION forming part of Letters Patent No. 619,655, dated February 14, 1899.

Application filed September 9, 1898. Serial No. 690,595. (No model.)

*To all whom it may concern:*

Be it known that I, CLAUDE WILLIAM ATKINSON, a subject of the Queen of Great Britain and Ireland, and a resident of Penarth, in the county of Glamorgan, England, have invented a new and useful Improvement in Cycles and the Like, (for which I have made application for Letters Patent in Great Britain under No. 20,393, bearing date the 4th day of September, 1897,) of which the following is a specification.

This invention relates to bicycles, tricycles, and similar machines, and has for its object the arrangement and construction of those parts of these machines which form the framing on which the load is carried and supported on the axles on which the wheels revolve, whereby considerable decrease in weight of these parts can be obtained without reduction in strength, and also reduction in cost of manufacture is effected. Structures of this kind are in general built up of several members which when the structure is loaded are subjected to forces tending either to stretch, compress, or bend them, and the different members must be sufficiently strong to resist these forces. The actual magnitude of the forces is usually comparatively small. When these forces are those of simple tension or compression, so that were the members of the structure liable to be subjected to these simple forces only, the cross-section of the material of which they are composed might be small. In the frames usually built, however, the various members of the structure are not in general subject to forces of simple tension or compression only. This arises either from the structure not being so perfectly braced as to avoid completely having bending actions on some of the members when the load is applied or frequently variations in the position of the load or alterations in external forces due to the actions when in use cause members which have previously been in tension to become in compression, or vice versa, or to be subject to bending moments. In addition to this forces not due to direct loading of the structure in the usual way may be either accidentally or purposely applied transversely to some of the members, subjecting them to bending actions. On account of these several reasons it is necessary in the frames usually built to make the several members of such sizes and shapes as will allow of members which, under normal conditions, would be subject to tensional forces being put into compression and will also allow of bending actions being applied to any of them, and on this account the amount of material required to resist these variations in direction of the forces or these bending actions is largely in excess of what would be required to resist simple forces of tension or compression only.

In order to prevent the collapse of the structure when loaded, owing to imperfect bracing, the joints between the adjacent members are made rigid either by means of brazing or riveting, or the like, which is liable to reduce the strength of the material, or by means of rigid junction-pieces to which the adjacent members are separately and rigidly attached, which causes additional weight of material to be used. My invention consists in means for overcoming these difficulties, whereby the amount of material required in the structure is reduced. In order to effect this, I so design the structure that on loading it the various members can be subject to simple tensile or compressive forces only or that the bending actions shall be practically negligible or of unknown amount and direction, and I further design the structure so that the separate members of which it is built can be subjected only to forces either of compression or tension, and that those parts which are intended to be under compression can never be in tension and those parts which are intended to be in tension can never be in compression.

In order that my invention may be the better understood, I will now proceed to describe the same, reference being had to the accompanying drawings, and to the letters marked thereon, like letters referring to like parts in the several figures.

In carrying my invention into effect I build the structure of straight or curved members, which may be united to one another by means of pivotal joints or may form a continuous curve or curves.

For clearness I will describe my invention as applied to the construction of the main or rear frame of a bicycle of the ordinary safety type.

Figures 1, 2, 3, 4, 5, and 6 represent different views of frames made in accordance with my invention. In these figures those members which are constructed so as to be capable of resisting compressive forces are shown by means of thick lines, while those which are capable of resisting tensile forces only are denoted by means of thin lines. Fig. 1 is a side view of a frame built of straight members braced by means of members radiating from centers. Fig. 2 is a plan of two such frames braced together to form one frame. Fig. 3 is a side view of a frame built of straight members braced by means of members radiating from centers. Figs. 4 and 5 are side views of frames each built up of a continuous curved compression member braced by tension members radiating from centers. Fig. 6 is a plan of two such frames braced together so as to form one compound frame. Fig. 7 is a side view of a compression member according to my invention. Figs. 8 and 9 are part views of same, showing the pivoted connection of two such members and the connection of the bracing.

In order that the several members of the frame may when loaded be subjected to simple forces acting along their axes, I build the frame in the form of a polygon, as shown in Figs. 1 and 2, in which the frame is built up of the members A B C D E, each capable of resisting compressive forces acting along them, and these are united to one another at their junctions $K'$, $K^2$, $K^3$, $K^4$, and $K^5$ by means of pin-joints, so that unless otherwise braced they would be free to move relatively to one another in the plane of the frame.

The support L for the wheel-axle and the bearing M are placed wholly within the polygon $K'$, $K^2$, $K^3$, $K^4$, and $K^5$ and supported from the joints in this polygonal frame by means of tension members $l'$ $l^2$ $l^3$ $l^4$ $l^5$ and $m'$, $m^2$, $m^3$, $m^4$, and $m^5$, while these two supports are themselves united by means of the tie $m^6$. By this means I am able in the case where power is transmitted from the axle carried on the bearing M to the wheel supported on the center L by a chain belt or band to cause the forces due to the tension in the chain belt or band to be resisted by the tension members $l^5$, acting on L, and $m^2$ $m^3$, acting on M, these tension members transmitting the strain to the joints $K^5$, $K^2$, and $K^3$ and giving rise to corresponding compressions on the compression members of the frame.

In order to give lateral rigidity to the structure, I place two frames side by side, as shown in Fig. 2, and unite them at the joints by means of the struts $K'$, $K^2$, $K^3$, and $K^4$, while I cross-brace them by means of tension members radiating from the centers L and M in one frame to the joints in the other frame. In Fig. 2 I have shown some of the ties in one of the frames and some of these radiating from the centers to the joints in the other frame; but most of the tension members are left out for purposes of clearness. In Fig. 3 I show a further modification of this frame by the addition of the center N. The three centers L, M, and N are then united by means of the ties $n^5$ $n^4$ $m^6$, while ties radiate to the joints in the polygonal frame, and the compound frame, composed of two such frames placed side by side, is, as in the previous cases, braced by means of struts at the joints or at intervals along the members and ties radiating from the centers in one frame to the joints of the other.

In Fig. 4 I show a frame composed of a continuously-curved member C, capable of withstanding compression, braced by means of tension members $n'$ radiating from the center N, $m'$ radiating from the center M, and $l'$ radiating from the center L, these centers being tied together by means of the ties $n^5$ $n^4$ $m^6$. The center L forms the support for the axle of the wheel, and the center M forms the bearing for the axle to which power is applied. The load is supported from the struts S and S', which are attached to the member C by means of the pivotal joints $K'$ $K^{10}$ and braced thereto by the ties $t$ $t'$ $t^2$ $t^3$.

The bearings for the head or hinged joint uniting the rear frame to the front frame or fork are supported on the pins passing through the joints $K^2$ and $K^3$ on the struts H and H', which are attached to the member C by the pivotal joints $K^8$ and $K^9$ and tied thereto by the ties $t^4$ and $t^5$. When the pressures due to the load carried on the struts S and S' and transmitted through the struts H and H' are large, these would give rise to large forces acting on the member C and, owing to its curvature, give rise to considerable bending actions on those parts of the member which lie between the ties $n'$ $m'$ $l'$. In order to reduce this, I insert the rigid struts $G'$ $G^2$ $G^3$ $G^4$ (shown in Figs. 4 and 5) to transmit the pressures to the center N and so distribute them over a greater length of the member C through the ties $n'$.

In order to give lateral rigidity to the structure, I form a compound frame by placing two such frames side by side, as shown in Fig. 6, and I maintain them at a fixed distance apart by means of struts attached to the member C at intervals, and I prevent them from moving relatively to one another by means of ties radiating from the centers L, M, and N in one of the frames to the member C in the other frame of which the compound frame is composed. It is sometimes convenient to omit the center N, in which case the struts $G'$, $G^2$, $G^3$, and $G^4$, if used, will be supported by the center M and the ties $n'$ will be replaced by similar ties radiating from the center M and L.

In Fig. 5 I have shown a similar frame to that in Fig. 4, with the exception, however, that the struts $G^3$ $G^4$ are left out and the member C is supported by tension and compression members $G^5$ and $G^6$, radiating from an additional center $l$, which is similarly supported to the center L.

In frames such as I have described, composed of a structure built up of members united by means of pivotal joints or forming continuous curves and braced by means of tension members, a small variation in the length of one or more of the members will allow considerable deformation of the structure to take place. It is therefore necessary to insure that all the tension members are tight when the structure is unloaded, so that when the load is applied it is transmitted to the members without preliminary deformation of the structure. To insure this, I subject all the members to initial stress—that is to say, I permanently maintain the tension members in a state of tension and the compression members in a state of compression, and I provide means for adjusting the tension in the tension members in any of the usual ways.

I am aware that polygonal frames have been made having one or more ties between some of their angles; but these frames have differed entirely from those now described by me in not having the joints between the members pivotal, so as to insure the absence of bending actions due to loading of the structure and in not having the pressures due to loading or propulsion transmitted to the frame by means of tension members to avoid bending actions on the compression members.

I am also aware that frames have been constructed having the central part either circular or elliptic in shape and braced by tension members radiating from a center; but these frames have had brackets or subsidiary framings to carry the hinged joint or head, the bearing of the axle to which power is applied, and the support for the wheel-axle which have been directly attached to this circular or elliptic frame, so that when the structure has been loaded the central, circular, or elliptic part of the frame has been heavily stressed locally where these attachments have been made and considerable bending actions have resulted, due to the rigid and direct attachment of these brackets. Now by supporting the wheel-axle and the bearing of the axle to which power is applied within the frame, as I have described, I distribute the large pressures due to the forces on these parts over a large portion of the curved member, and similar results are obtained by means of the struts which I have described for transmitting the other pressures to a center within the frame.

In Figs. 7, 8, and 9 I show the construction in detail of a compression member, which consists of a series of rods or tubes—in this case four in number—which are maintained in position by being threaded through perforated washers or distance-pieces $s$. The ends of the rods are held within a pivotal cap P, which is adapted to hinge upon the cap at the end of the adjacent compression member by means of the pin T'. The tension member $n$ is formed of a piece of wire which is wrapped around the pin T' and has its ends taken to a center N, the tension being set up by nuts threaded upon the tension member, so as to put a tension strain therein.

For the purposes of clearness of illustration in the case of the frames I have not shown the complete system of bracing by including all the ties in the figures; but it will be clear from the description how the complete bracing is effected, which include the ties not shown in the figures.

I have only shown one means for initially stressing the frame, as described, or subsequently adjusting its form or the amount of stress; but it is obvious that any of the well-known methods may be employed for varying the length either of the compression or tension members to produce the desired result.

Having now particularly described and ascertained the nature of my said invention and in what manner the same is to be performed, I declare that what I claim is—

A bicycle-frame comprising the compression members, supports for the crank-axle and back-wheel axle, both located within the space inclosed by the compression members, tension members extending from said supports to various parts of the compression members, and tension members extending between the said supports, substantially as described.

In witness whereof I have hereunto set my hand in presence of two witnesses.

CLAUDE WILLIAM ATKINSON.

Witnesses:
RICHARD A. HOFFMANN,
CHARLES CARTER.